(12) United States Patent
Matsunaga et al.

(10) Patent No.: US 8,073,576 B2
(45) Date of Patent: Dec. 6, 2011

(54) ACCELERATION SENSATION EVALUATING DEVICE AND VEHICLE CONTROLLER

(75) Inventors: Akio Matsunaga, Susono (JP); Yusuke Nozaki, Suntou-gun (JP); Masanori Shimada, Susono (JP); Eiichi Yasuda, Owariasahi (JP); Masahiko Mizuno, Owariasahi (JP); Kazukata Takei, Toyota (JP); Eiichi Ono, Toyota (JP); Noriyoshi Terazawa, Owariasahi (JP); Mitsuteru Kokubun, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1021 days.

(21) Appl. No.: 11/922,396

(22) PCT Filed: Jul. 4, 2006

(86) PCT No.: PCT/JP2006/313637
§ 371 (c)(1),
(2), (4) Date: Dec. 18, 2007

(87) PCT Pub. No.: WO2007/004734
PCT Pub. Date: Jan. 11, 2007

(65) Prior Publication Data
US 2009/0043428 A1  Feb. 12, 2009

(30) Foreign Application Priority Data
Jul. 5, 2005  (JP) .................................. 2005-196124

(51) Int. Cl.
*G05D 1/00* (2006.01)
*G06F 19/00* (2011.01)

(52) U.S. Cl. .................. 701/1; 701/35; 701/49; 701/70; 701/72; 701/78; 701/93; 701/96; 701/207; 701/301

(58) Field of Classification Search ........................ None
See application file for complete search history.

(56) References Cited

U.S. PATENT DOCUMENTS

| 4,930,084 | A |   | 5/1990 | Hosaka et al. |
|---|---|---|---|---|
| 5,229,955 | A | * | 7/1993 | Nishiwaki et al. ............... 701/40 |
| 5,292,995 | A | * | 3/1994 | Usa ................................. 84/626 |
| 5,329,454 | A | * | 7/1994 | Takada et al. .................... 701/95 |
| 5,521,823 | A | * | 5/1996 | Akita et al. ....................... 701/36 |

(Continued)

FOREIGN PATENT DOCUMENTS

EP   0 389 262 A   9/1990
(Continued)

*Primary Examiner* — Khoi Tran
*Assistant Examiner* — Ian Jen
(74) *Attorney, Agent, or Firm* — Kenyon & Kenyon LLP

(57) ABSTRACT

The present invention provides an acceleration sensation evaluating device that evaluates a sensory acceleration of a driver with respect to an expectation value of acceleration, and a vehicle controller that controls a vehicle according to the evaluation results. The evaluation device detects an amount of operation of the vehicle by the driver of when the vehicle is accelerated, detects an amount of vehicle behavior, computes a physical quantity of an expectation value indicating the expectation value of an acceleration performance which the driver expects based on the detected values, computes a sensory physical quantity indicating a sensation of the acceleration which the driver senses, and computes an evaluation value of the acceleration sensation based on difference or ratio between the physical quantity of the expectation value and the sensory physical quantity.

10 Claims, 9 Drawing Sheets

ACCELERATION SENSATION EVALUATING DEVICE

U.S. PATENT DOCUMENTS

| | | | |
|---|---|---|---|
| 5,986,545 A * | 11/1999 | Sanada et al. | 340/439 |
| 6,308,115 B1 * | 10/2001 | Yamaguchi et al. | 701/1 |
| 2002/0023062 A1 * | 2/2002 | Kamihira | 706/11 |
| 2002/0049118 A1 * | 4/2002 | Vornehm et al. | 477/107 |
| 2003/0158647 A1 * | 8/2003 | Katakura et al. | 701/70 |
| 2003/0191567 A1 * | 10/2003 | Gentilcore | 701/35 |
| 2004/0014209 A1 * | 1/2004 | Lassar et al. | 435/366 |
| 2004/0078836 A1 * | 4/2004 | Farese et al. | 800/14 |
| 2004/0097328 A1 | 5/2004 | Makiyama et al. | |
| 2004/0216174 A1 * | 10/2004 | Hekimi et al. | 800/3 |
| 2004/0220098 A1 * | 11/2004 | Satterlee et al. | 514/12 |
| 2004/0261139 A1 * | 12/2004 | Chang et al. | 800/18 |
| 2005/0069839 A1 * | 3/2005 | Denne | 434/29 |
| 2005/0085985 A1 * | 4/2005 | Suzuki et al. | 701/70 |
| 2005/0106697 A1 * | 5/2005 | Cases et al. | 435/193 |

FOREIGN PATENT DOCUMENTS

| | | |
|---|---|---|
| JP | 63-287635 A | 11/1988 |
| JP | 03-129160 A | 6/1991 |
| JP | 06-058181 A | 3/1994 |
| JP | 07-244065 A | 9/1995 |
| JP | 10-264681 A | 10/1998 |
| JP | 2002-213599 A | 7/2002 |
| JP | 2004-162800 A | 6/2004 |
| JP | 2004-530088 A | 9/2004 |
| JP | 2005-075180 A | 3/2005 |

* cited by examiner

FIRST EMBODIMENT OF ACCELERATION SENSATION EVALUATING DEVICE

SECOND EMBODIMENT OF ACCELERATION SENSATION EVALUATING DEVICE

RUNNING ENVIRONMENT COMPENSATION TYPE ACCELERATION
PERFORMANCE- ADAPTIVE VEHICLE CONTROLLER

ACCELERATION SENSATION EVALUATING DEVICE AND VEHICLE CONTROLLER

This is a 371 national phase application of PCT/JP2006/313637 filed 4 Jul. 2006, which claims priority to Japanese Patent Application No. 2005-196124 filed 5 Jul. 2005, the contents of which are incorporated herein by reference.

TECHNICAL FIELD

The present invention relates to an acceleration sensation evaluating device and a vehicle controller. More specifically, the present invention relates to an acceleration sensation evaluating device capable of evaluating the acceleration sensation which the driver senses in an actual vehicle and a vehicle controller capable of realizing an acceleration performance which the driver expects.

BACKGROUND ART

A modeling system of a conventional power transmission mechanism for vehicle that forms the basis for the present invention uses a vehicle model and a human model to evaluate the switching characteristic of the power transmission mechanism for a vehicle using a pitch angle of a head of a driver, a visual amount of a tachometer, an audible amount of an engine revolutions, and a normal pressure waveform acting on a body of the driver (Japanese Patent Application National Publication (Laid-Open) No. 2004-530088).

In the conventional art, however, a physical quantity indicating an expectation value of the acceleration of the driver is not computed. Therefore, there is a problem that a sensory acceleration of the driver with respect to the expectation value of the acceleration cannot be evaluated.

DISCLOSURE OF THE INVENTION

Problems to be Solved by the Invention

The present invention is to address the above problem and an object of the present invention is to provide an acceleration sensation evaluating device capable of evaluating a sensory acceleration of a driver with respect to an expectation value of the acceleration, by computing a physical quantity indicating the expectation value of the acceleration of the driver, and a vehicle controller capable of realizing the acceleration performance which the driver expects.

Means for Solving the Problems

To achieve the above object, a first aspect of the present invention is an acceleration sensation evaluating device including: an operation amount detecting section that detects an amount of operation of a vehicle by a driver when the vehicle is accelerated; a vehicle/person behavior detecting section that detects an amount of vehicle behavior, or the amount of vehicle behavior and an amount of driver behavior; an expectation value physical quantity computing section that computes a physical quantity of an expectation value indicating the expectation value of an acceleration performance that the driver expects, based on the detected value of the operation amount detecting section and the detected value of the vehicle/person behavior detecting section; a sensory physical quantity computing section that computes a sensory physical quantity indicating a sensation of the acceleration which the driver senses, based on the detected value of the vehicle/person behavior detecting section; a comparing/computing section that compares the physical quantity of the expectation value with the sensory physical quantity and outputs a comparison result; and an evaluation value computing section that computes an evaluation value of the acceleration sensation based on the output of the comparing/computing section.

In the acceleration sensation evaluating device in this aspect, using the physical quantity of the expectation value indicating the expectation value of the acceleration performance which the driver expects obtained from the amount of operation of the vehicle by the driver as a target value, the acceleration sensation is evaluated based on difference or ratio between the physical quantity of the expectation value and, for example, the physical quantity indicating the sensation which the driver senses via the driver's seat. As compared with an acceleration performance evaluating method of evaluating the acceleration sensation only by the vehicle physical quantity in a particular running pattern such as full throttle acceleration, the acceleration sensation evaluating device in this aspect can evaluate the acceleration sensation in various running patterns.

The acceleration sensation evaluating device of this aspect may further include a driver psychological characteristic compensating section for correcting the physical quantity of the expectation value in order to compensate for a psychological characteristic of the driver according to a running environment.

A second aspect of the present invention is a vehicle controller including: an operation amount detecting section that detects an amount of operation of a vehicle by a driver when the vehicle is accelerated; a vehicle/person behavior detecting section that detects an amount of vehicle behavior, or the amount of vehicle behavior and an amount of driver behavior; an expectation value physical quantity computing section that computes a physical quantity of an expectation value indicating the expectation value of an acceleration performance which the driver expects, based on the detected value of the operation amount detecting section and the detected value of the vehicle/person behavior detecting section; a sensory physical quantity computing section that computes a sensory physical quantity indicating a sensation of the acceleration which the driver senses, based on the detected value of the vehicle/person behavior detecting section; a comparing/computing section that compares the physical quantity of the expectation value with the sensory physical quantity and outputs a comparison result; a dead band section to which the output of the comparing/computing section is input and in which a human threshold characteristic is set to be a dead band; a vehicle/human body response compensating section to which the output of the dead band section is input, and that compensates and outputs a response characteristic of the vehicle and the human body; and a controlling section that controls the vehicle so as to obtain the acceleration performance which the driver expects based on the output of the vehicle/human body response compensating section.

In the vehicle controller in this aspect, the vehicle is controlled so as to obtain an acceleration performance expected by the driver based on difference or ratio exceeding the dead band of the human threshold characteristic, e.g., the dead band of the perception threshold value of the human. Therefore, phase compensation is performed from control of the vehicle to the front/rear oscillation of the human body, and a smooth acceleration performance can be obtained.

In the vehicle controller in this aspect, at least one of an engine torque and a gear ratio of a transmission can be controlled.

The expectation value physical quantity computing section in the first and second aspects may include: a vehicle front/ rear acceleration computing section that computes the vehicle front/rear acceleration based on a throttle opening, a speed change gear of a transmission, a vehicle weight, vehicle speed, and running road information; a response characteristic filter element that corrects and outputs the vehicle front/rear acceleration according to a response characteristic based on the running road information; and a differentiating element that differentiates the output value from the response characteristic filter element.

The sensory physical quantity computing section of the acceleration sensation evaluating device of the first aspect may include a cutaneous sensation acceleration computing section that computes and outputs, based on an amount of change of a pushing load acting on a back of the driver before and after the acceleration, when the back of the driver is pushed against a seatback due to the front/rear oscillation of the driver at acceleration, a front/rear acceleration equivalent to the amount of change as a cutaneous sensation acceleration; and a differentiating element that differentiates the output value from the cutaneous sensation acceleration computing section and outputs the differentiation result as a cutaneous sensation front/rear jerk.

The vehicle/person behavior detecting section of the acceleration sensation evaluating device of the first aspect may detect a front/rear acceleration of the head of the driver, a front/rear acceleration of a shoulder of the driver, and a pitch angle of the shoulder of the driver, and the sensory physical quantity computing section includes a deep sensation acceleration computing section that computes a front/rear jerk of a neck of the driver and as deep sensation acceleration, based on the front/rear acceleration of the head of the driver, the front/rear acceleration of the shoulder of the driver, and the pitch angle of the shoulder of the driver.

The sensory physical quantity computing section of the vehicle controller of the second aspect may include: a load ratio difference computing section that computes and outputs, as a load ratio difference, an amount of change of a pushing load acting on a back of the driver before and after the acceleration, when the back of the driver is pushed against a seatback due to the front/rear oscillation of the driver at acceleration; and a differentiating element that differentiates the output value from the load ratio difference computing section and outputs a differentiation result as a speed of the load ratio difference.

The width of the dead band of the dead band section of the second aspect may be changed according to the magnitude of the physical quantity of the expectation value.

Effect of the Invention

As described above, according to the acceleration sensation evaluating device of the present invention, the acceleration sensation is evaluated based on difference or ratio between the physical quantity of the expectation value indicating the expectation value of the acceleration performance which the driver expects, obtained from the amount of operation of the vehicle by the driver, and the physical quantity indicating the sensation which the driver senses. Therefore, the acceleration sensation can be evaluated in various running patterns.

Further, according to the vehicle controller of the present invention, the vehicle is controlled so as to obtain the acceleration performance which the driver expects based on difference or ratio exceeding the dead band of the human threshold characteristic. Therefore, phase compensation is performed from control of the vehicle to the front/rear oscillation of the human body, and the smooth acceleration performance may be obtained.

BEST MODES FOR CARRYING OUT THE INVENTION

Embodiments of the present invention will be described below in detail with reference to the drawings. In a first exemplary embodiment, a throttle opening and a level of speed change gear (or gear change mode) are detected as an amount of operation related to the acceleration when a driver operates a vehicle. A pitch angle, a vehicle weight, engine revolutions, vehicle speed, a road inclination, a cushion load Wc as a load to a cushion of a seat, a backrest load Wb as a load to a backrest of the seat, and a floor front/rear acceleration are detected as amounts of vehicle/person state. The acceleration sensation is evaluated based on these detected results.

Figure 1:
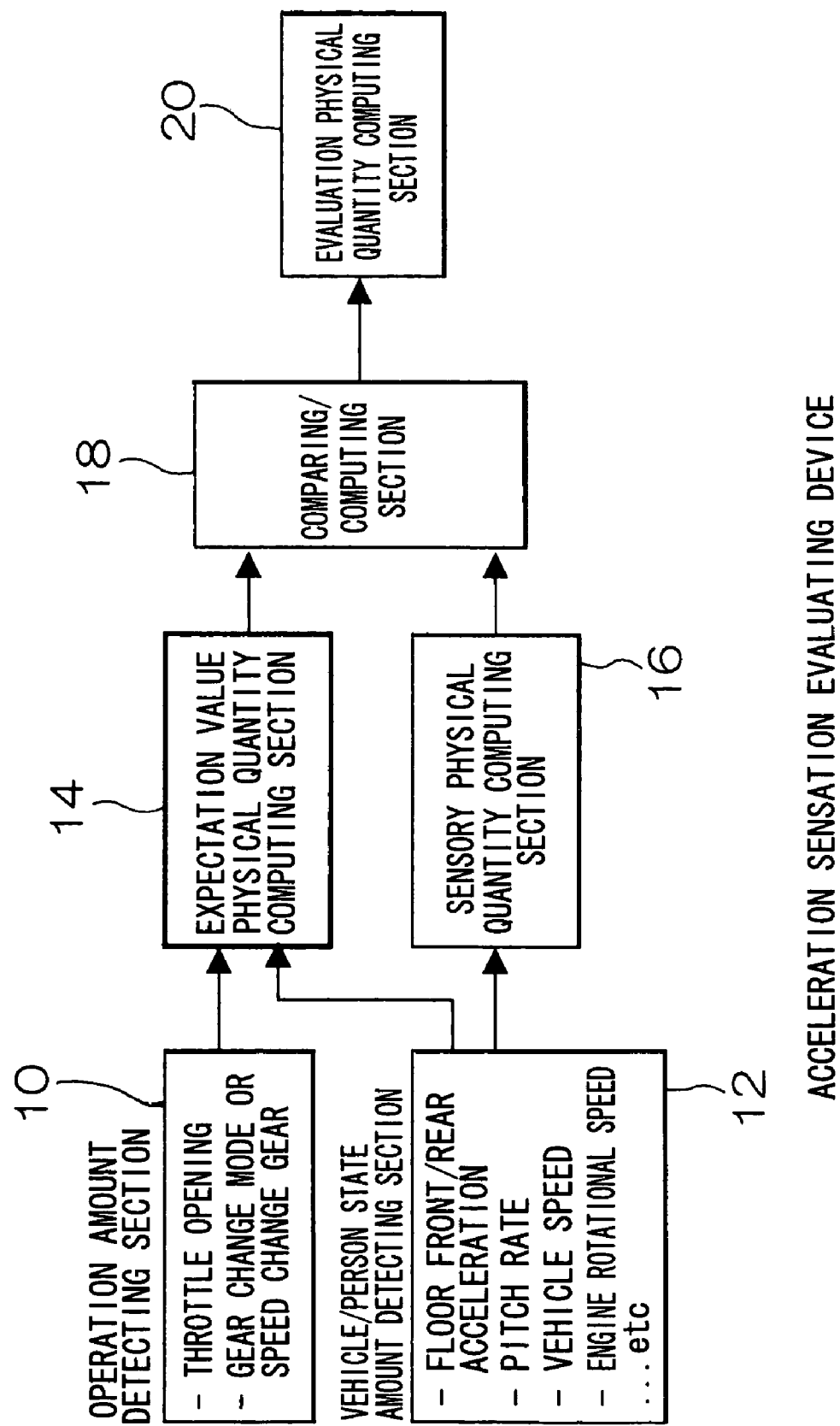
FIG. 1 is a block diagram showing an acceleration sensation evaluating device of a first exemplary embodiment of the present invention.

As shown in FIG. 1, the acceleration sensation evaluating device of the first exemplary embodiment includes an operation amount detecting section 10 and a vehicle/person state amount detecting section 12. The operation amount detecting section 10 detects the amount of operation of the vehicle, such as a throttle opening and a gear change mode or a level of speed change gear, as the amount of operation related to the acceleration of when the driver operates the vehicle. The vehicle/person state amount detecting section 12 detects at least one of an amount of vehicle state and an amount of person state as an amount of driver state. The amount of vehicle state includes a pitch angle, the cushion load Wc as the load acting on the seat cushion from the driver at acceleration, the backrest load Wb as the load acting on the backrest from the back of the driver when the back of the driver is pushed against the seatback due to front/rear oscillation of the driver at acceleration, the floor front/rear acceleration, the vehicle weight, the vehicle speed, and the road inclination.

The amount of operation of the vehicle detected by the operation amount detecting section 10 and the amount of vehicle/person state detected by the state amount detecting section 12 can be changed according to conditions of accuracy of the evaluation of the acceleration sensation. The state amount detecting section 12 may also detect the amount of vehicle state, such as a pitch rate, the vehicle speed, and the engine revolutions, and may further detect the amount of person state as the amount of driver state.

The output ends of the operation amount detecting section 10 and the state amount detecting section 12 are connected to an expectation value physical quantity computing section 14. The expectation value physical quantity computing section 14 computes a physical quantity of an expectation value indicating an expectation value of the acceleration performance which the driver expects based on the throttle opening and the level of speed change gear as the amount of operation, and the vehicle weight, the vehicle speed, and the road inclination as the amount of vehicle state. The output end of the vehicle/person state amount detecting section 12 is connected to a sensory physical quantity computing section 16 as well as the expectation value physical quantity computing section 14. The sensory physical quantity computing section 16 computes a sensory physical quantity indicating sensation of the acceleration which the driver senses, based on the cushion load Wc, the backrest load Wb, and the floor front/rear acceleration.

The expectation value physical quantity computing section 14 and the sensory physical quantity computing section 16 are connected to a comparing/computing section 18. The comparing/computing section 18 computes difference between the physical quantity of the expectation value and the sensory physical quantity, or a ratio of the physical quantity of the expectation value and the sensory physical quantity. Either the physical quantity of the expectation value or the sensory physical quantity can be used as the base for the difference or the ratio computed by the comparing/computing section 18. By computing the difference or the ratio, an index indicating how much the sensation is with respect to the expectation value can be computed.

The comparing/computing section 18 is connected to an evaluation physical quantity computing section 20. The evaluation physical quantity computing section 20 computes an evaluation value (evaluation physical quantity) H of the sensory physical quantity with respect to the physical quantity of the expectation value, based on the output of the comparing/computing section 18.

Figure 2:
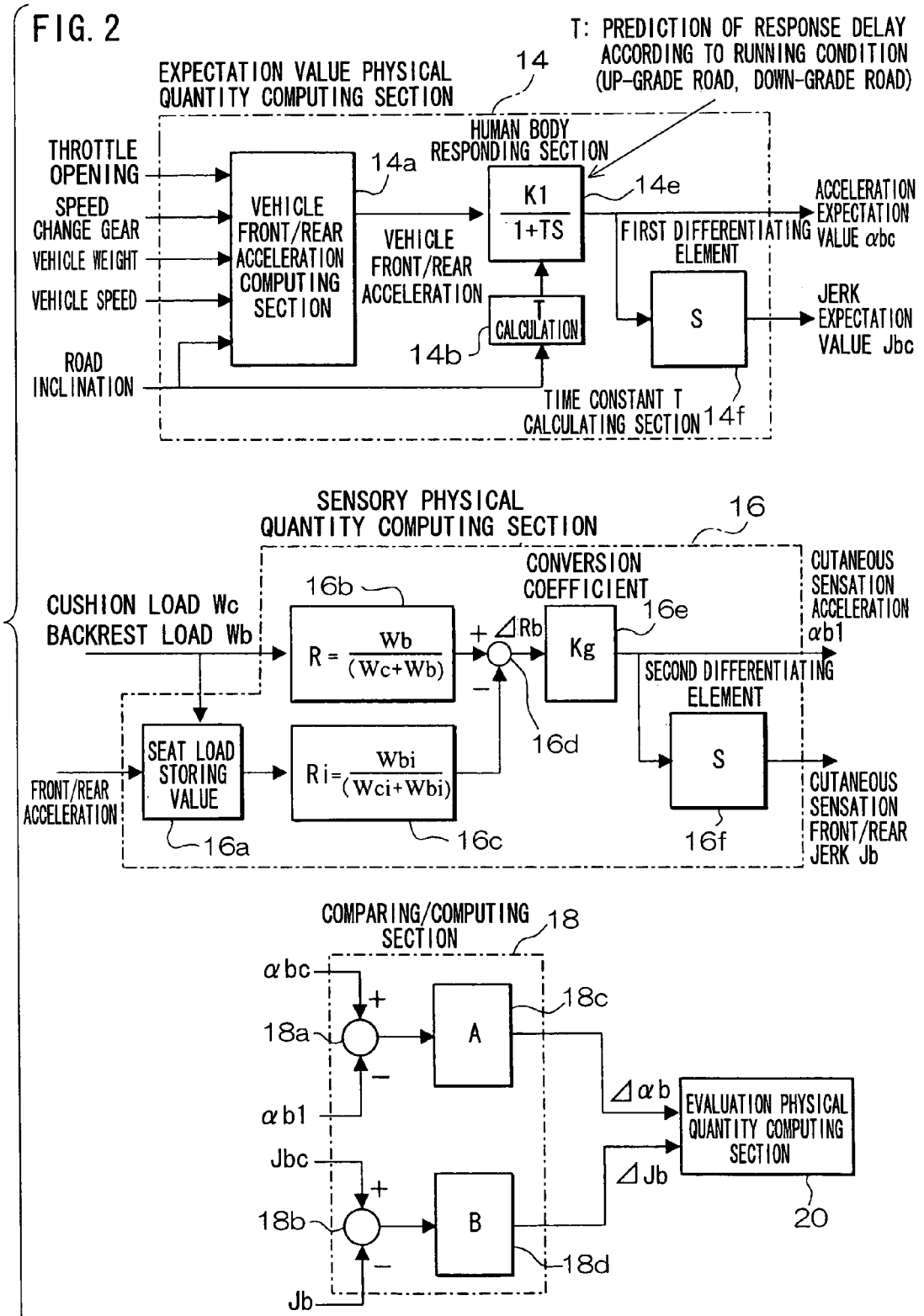
FIG. 2 is a block diagram showing the detail of the acceleration sensation evaluating device of the first exemplary embodiment.

As shown in FIG. 2, the expectation value physical quantity computing section 14 includes a vehicle front/rear acceleration computing section 14a and a response delay time calculating section 14b. The vehicle front/rear acceleration computing section 14a computes a vehicle front/rear acceleration $\alpha$, which is the acceleration of the vehicle in the front-rear direction, based on the throttle opening, the level of speed change gear, the vehicle weight, the vehicle speed, and the road inclination. The response delay time calculating section 14b calculates a response delay time (time constant) T due to the running road state based on the road inclination. The response delay time calculating section 14b calculates the response delay time T according to an up-grade road or a down-grade road, for example.

The vehicle front/rear acceleration computing section 14a is connected to a human body responding section 14e having a first order delay element constituted by a response characteristic filter. The response characteristic filter includes the response delay time T according to the running road information, such as an up-grade road and a down-grade road, and a final value K1, and corrects the physical quantity of the expectation value of the acceleration performance according to the response characteristic based on the running road information. The response delay time T is response time of the human body response which the driver expects from the road inclination detected by the state detecting section 12. By passing the vehicle front/rear acceleration $\alpha$ through the first order delay element of the human body responding section 14e, which includes the final value (gain) K1, an acceleration expectation value $\alpha bc$ indicating the acceleration equivalent to the pressure feeling of the back of the driver is outputted. That is, the human body responding section 14e outputs the expectation value of the acceleration expected in response to the human body oscillation in the front-rear direction due to the spring of the backrest and the mass of the occupant, with respect to the floor front/rear acceleration.

The output end of the human body responding section 14e is connected to a first differentiating section 14f for differentiating the output of the human body responding section 14e. The acceleration expectation value $\alpha bc$, which is the output of the human body responding section 14e, is differentiated to output a jerk expectation value Jbc.

Here, as described above, the human body responding section of this exemplary embodiment uses the first order delay having the gain K1. However, the present invention is not limited to this configuration. The human body responding section may use n-order delay characteristic.

In this exemplary embodiment, the above configuration is the minimum configuration. To improve the computation accuracy of the expectation value physical quantity computing section, an upper body front/rear transmission function may be provided.

The sensory physical quantity computing section 16 includes a seat load storing section 16a. The seat load storing section 16a stores seat loads (a cushion load Wci and a backrest load Wbi) before the floor front/rear acceleration occurs, based on the floor front/rear acceleration.

The sensory physical quantity computing section 16 also includes a load ratio computing section 16b and a load ratio computing section 16c. The load ratio computing section 16b computes the ratio of the backrest Wb to the sum of the current cushion load Wc and the backrest load Wb, that is, a load ratio R after the acceleration. The load ratio computing section 16c computes the ratio of the backrest Wbi to the sum of the cushion load Wci and the backrest load Wbi before the acceleration, that is, a load ratio Ri before the acceleration. Here, the load ratio computing sections compute the seat load ratios to eliminate the difference in weight between drivers.

The output ends of the load ratio computing section 16b and the load ratio computing section 16c are connected to a subtracting element 16d. The subtracting element 16d computes a load ratio difference $\Delta Rb$ obtained by subtracting the load ratio Ri before the acceleration from the load ratio R after the acceleration. The output end of the subtracting element 16d is connected to a multiplying element 16e. The multiplying element 16e multiplies the load ratio difference $\Delta Rb$ by a conversion coefficient Kg for converting the load ratio difference $\Delta Rb$ to a cutaneous sensation acceleration $\alpha b1$. The multiplying element 16e outputs the product obtained by multiplying the load ratio difference $\Delta Rb$ by the conversion coefficient Kg as the cutaneous sensation acceleration $\alpha b1$. Thus, the front/rear acceleration equivalent to the amount of change can be computed as the cutaneous sensation acceleration $\alpha b1$ based on the amount of change of a pushing load before and after the acceleration, acting on the back of the driver, when the back of the driver is pushed against the seatback due to the front/rear oscillation of the driver at acceleration, i.e., the load ratio difference.

The output end of the multiplying element 16e is connected to a second differentiating element 16f for differentiating the output of the multiplying element 16e, and a cutaneous sensation front/rear jerk Jb is output by differentiating the cutaneous sensation acceleration $\alpha b1$.

The comparing/computing section 18 includes a subtracting element 18a and a subtracting element 18b. The subtracting element 18a outputs a difference obtained by subtracting the cutaneous sensation acceleration $\alpha b1$ from the acceleration expectation value $\alpha bc$. The subtracting element 18b outputs a difference obtained by subtracting the cutaneous sensation jerk Jb from the jerk expectation value Jbc. The subtracting element 18a is connected to a multiplying element 18c for multiplying the difference by a coefficient A. The subtracting element 18b is connected to a multiplying element 18d for multiplying the difference by a coefficient B.

An evaluation physical quantity computing section 20 evaluates, based on the outputs of the multiplying element 18c and the multiplying element 18d, how much the sensory physical quantity which the driver actually senses is, with respect to the expectation values of the acceleration (the acceleration expectation value $\alpha bc$, and the jerk expectation value Jbc) of the driver obtained from the throttle opening, and outputs the evaluation value (evaluation physical quantity) H.

Calculation of the evaluation value H will be described below. The evaluation physical quantity computing section 20 computes the evaluation physical quantity, based on the correlation equation of outputs $\Delta\alpha b$ and $\Delta Jb$ of the comparing/computing section 18 and the previously conducted acceleration sensation evaluation. In this exemplary embodiment, the evaluation value H is computed according to the following equation based on the regression equation of the acceleration difference $\Delta\alpha b$ and the jerk difference $\Delta Jb$ as inputs and the sensation evaluation:

$$H = k1\Delta\alpha b + k2\Delta Jb + C \quad (1)$$

where k1 and k2 are regression coefficients and C is a constant.

Although a linear regression equation is shown above as the regression equation for determining the evaluation value, the present invention is not limited to this. A non-linear regression equation may be used to determine the evaluation value.

The throttle opening of the driver obtained by the operation amount detecting section 10 of this exemplary embodiment is information indicating intensions of the acceleration and deceleration of the driver. When the throttle opening is increased, it could be regarded that the vehicle speed increase (or the driving force increase) is requested with respect to the current vehicle speed, that is, the throttle opening may be regarded to as corresponding to the vehicle acceleration. However, the caused vehicle accelerations may have different driving forces according to the speed change gear of the transmission even if the throttle opening is same. Further, the vehicle acceleration is determined based on a balance of the vehicle speed and the running resistances due to the road inclination. Therefore, the vehicle front/rear acceleration computing section 14a estimates the vehicle front/rear acceleration from the throttle opening, the driving force according to the speed change gear of the transmission, the vehicle speed, the running resistance determined by the road inclination and the vehicle weight.

As sense organs in which the driver senses the acceleration with respect to the caused vehicle acceleration, there is a somatic sense organ including cutaneous sensation and deep sensation. In the cutaneous sensation, the load and the change of load when the back is pushed against the seat are sensed by the Merkel's disks and the Meissner's corpuscles which are cutaneous sensation receptors. The deep sensation is sensed by movement (extension and contraction) of the muscle and the tendon through the muscle spindle present in the musculoskeletal muscle in order to maintain the posture. Thus, a magnitude of the acceleration in acceleration experience in various vehicles is considered to be memorized as an amount of somatic sensation.

Accordingly, the acceleration expected with respect to the acceleration operation of the driver can be represented by the physical quantity which the driver senses by the somatic sensation. In this regard, the embodiment in which the human body response is added to the vehicle acceleration, the characteristic without acceleration shock is assumed as an ideal expectation value, and the first order delay is used as the characteristic of the human body responding section is described above. Regarding the time constant T of the first order delay, the response time which the driver expects is different between an up-grade road and a down-grade road. In other words, the driver expects from the empirical rule that the time constant T of the up-grade road is larger than that of a flat road. Further, the driver expects that the time constant T of the down-grade road is smaller than that of the flat road. The thus obtained acceleration expectation value $\alpha bc$ is differentiated by the first differentiating element to compute the jerk expectation value Jbc. This corresponds to the change of load sensed by the cutaneous sensation receptor (the mass of the upper body is not changed before and after the acceleration).

According to this exemplary embodiment, the physical quantity of the expectation value of the acceleration is computed from the amount of operation related to the acceleration and the amount of vehicle state, and the sensory physical quantity of the acceleration is computed from the amount of vehicle state. Based on the difference between the physical quantity of the expectation value of the computed acceleration and the sensory physical quantity of the acceleration or the ratio of them, the amount of the sensation of the acceleration with respect to the expectation of the acceleration of the driver can be evaluated.

Next, an acceleration sensation evaluating device of a second exemplary embodiment of the present invention will be described with reference to FIG. 3. In this exemplary embodiment, the vehicle/person state amount detecting section detects the amount of vehicle state and the amount of person state (the amount of vehicle/person state) and computes a neck front/rear jerk Jn and a deep sensation acceleration $\alpha b2$ as the sensory physical quantities in addition to the cutaneous sensation acceleration $\alpha b1$ and the cutaneous sensation front/rear jerk Jb used in the first exemplary embodiment. Therefore, in this exemplary embodiment, as shown in FIG. 3, in addition to the floor front/rear acceleration, the cushion load Wc, and the backrest load Wb, a driver head front/rear acceleration ah, a driver shoulder front/rear acceleration $\alpha s$, and a driver shoulder pitch angle Ps are detected as the amount of vehicle/person state.

Figure 3:
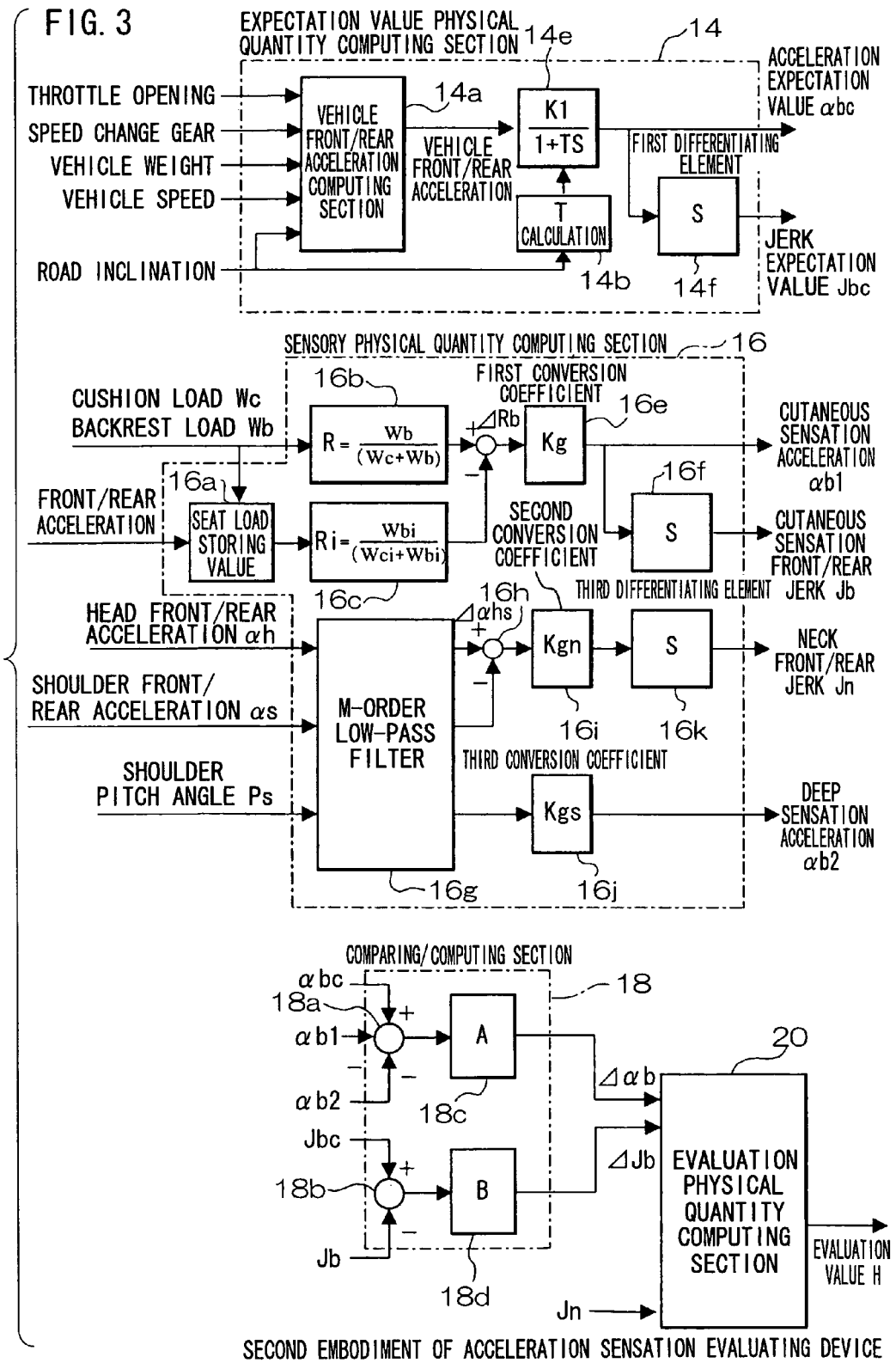
FIG. 3 is a block diagram showing the detail of an acceleration sensation evaluating device of a second exemplary embodiment.

Parts in FIG. 3 corresponding to those in FIG. 1 are indicated by the same reference numerals and the descriptions are omitted.

In this exemplary embodiment, the vehicle/person state amount detecting section 12 further detects the driver head front/rear acceleration ah, the driver shoulder front/rear acceleration as, and the driver shoulder pitch angle Ps.

Further, as shown in FIG. 3, the sensory physical quantity computing section 16 of this exemplary embodiment includes an M-order low-pass filter 16g. The low-pass filter 16g is provided for removing noise and variation component above a response frequency of a human body oscillation. The respective detected values of the driver head front/rear acceleration αh, the driver shoulder front/rear acceleration αs, and the driver shoulder pitch angle Ps, are input to the low-pass filter 16g to remove noise and the variation component above the response frequency of the human body oscillation. A subtracting element 16h is provided at the output end of the low-pass filter 16g. The subtracting element 16h outputs a difference Δαhs obtained by subtracting the driver shoulder front/rear acceleration as from the detected value of the driver head front/rear acceleration ah. The difference Δαhs indicates the acceleration acting on the neck as a stimulation-force.

The sensory physical quantity computing section 16 includes a multiplying element 16i and a multiplying element 16j. The multiplying element 16i multiplies the acceleration by a second conversion coefficient Kgn for converting the acceleration to a force. The multiplying element 16i multiplies the difference output from the subtracting element 16h by the conversion coefficient Kgn and converts the difference to a force for output. The multiplying element 16j multiplies the pitch angle Ps by a third conversion coefficient Kgs for converting the pitch angle Ps to the deep sensation acceleration αb2.

A third differentiating element 16k is provided at the output end of the multiplying element 16i. The third differentiating element 16k differentiates the output of the multiplying element 16i and outputs it as the front/rear jerk Jn. The front/rear jerk Jn is the amount in proportion to the amount of change of the neck front/rear stimulation force.

In this exemplary embodiment, the output of the multiplying element 16i is differentiated by the third differentiating element 16k to compute the neck front/rear jerk Jn, which is in proportion to the change of the stimulation force acting on the neck. The reason why the neck front/rear jerk Jn is computed is that it is considered that since the mass of the head is smaller than that of the upper body, when sudden acceleration occurs, the head moves rearward before the upper body before the posture maintaining function acts. The muscular strength of the neck then attempts to return the head to the original position, and the strength of the acceleration shock can be considered to be sensed by the magnitude of the jerk acting on the neck at this time.

The shoulder pitch angle Ps from which noise and variation above the response frequency of the human body oscillation are removed is input to the multiplying element 16j, and a value obtained by multiplying the pitch angle Ps by the third conversion coefficient Kgs is output as the deep sensation acceleration αb2. The deep sensation acceleration αb2 corresponds to an amount to which the driver holds his/her posture by his/her own body.

The subtracting element 18a provided in the comparing/computing section 18 of this exemplary embodiment subtracts the sum of the cutaneous sensation acceleration αb1 and the deep sensation acceleration αb2 from the acceleration expectation value αbc. The multiplying element 18c multiplies the difference (=αbc−αb1−αb2) by the coefficient A to convert the difference to the acceleration difference Δαb. Further, the difference obtained by subtracting the cutaneous sensation front/rear jerk Jb from the jerk expectation value Jbc is multiplied by the coefficient B to compute the jerk difference ΔJb. Then, the evaluation value H is computed based on the above equation (1).

In this exemplary embodiment, in addition to the cutaneous sensation acceleration αb1 and the cutaneous sensation front/rear jerk Jb, the neck front/rear jerk Jn and the deep sensation acceleration αb2 are computed as the sensory physical quantities. Therefore, in the second exemplary embodiment, the acceleration sensation may be evaluated more accurately than that in the first exemplary embodiment.

Figure 4:
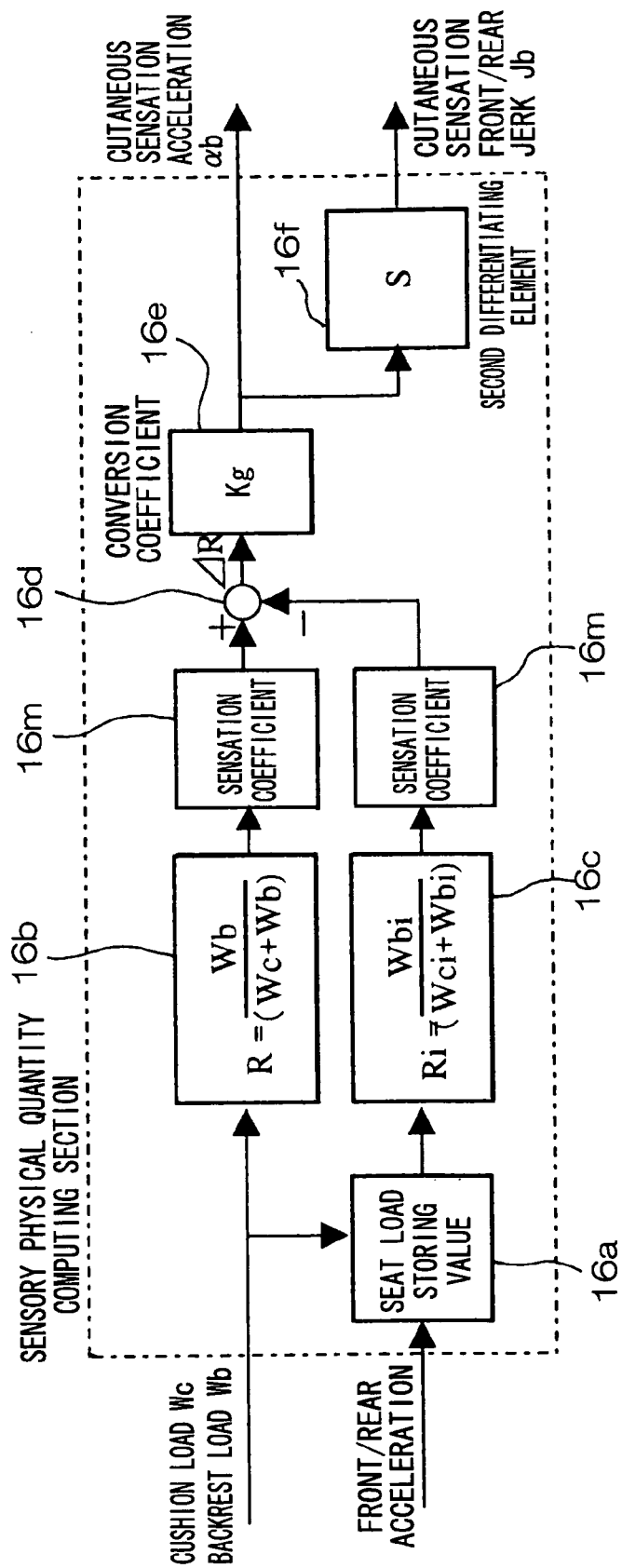
FIG. 4 is a block diagram showing a modification (a third exemplary embodiment) of an acceleration sensation evaluating device of the invention.
Figure 5:
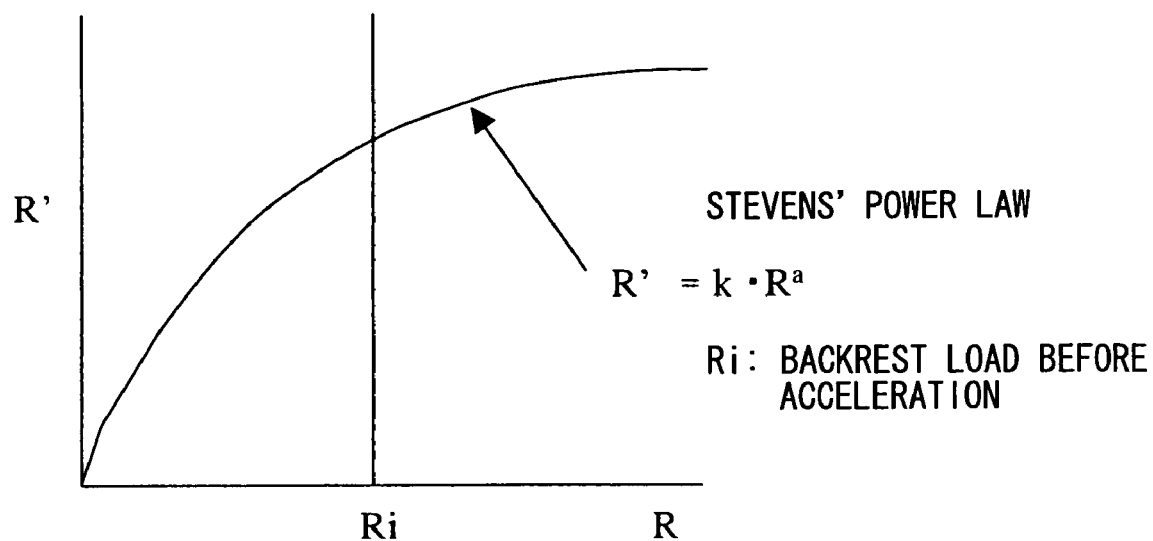
FIG. 5 is a diagram showing the characteristic of the Stevens' power law used in converting elements of FIG. 4.

Next, a modification (a third exemplary embodiment) of the acceleration sensation evaluating device of the present invention will be described. In this modification, as shown in FIG. 4, the load ratios input from the output ends of the two load ratio computing sections 16b and 16c of the sensory physical quantity computing section are converted according to the Stevens' power law expressed by the following equation (2), which describes a relation between stimulation and sensation. FIG. 5 shows the characteristic of the Stevens' power law.

$$R' = k \cdot R^a \qquad (2)$$

Here, R is a load ratio corresponding to stimulation, R' is a physical quantity expressing sensation, and k and a are parameters.

According to this modification, converting elements 16m using the sensation coefficients k convert the load ratio R after the acceleration and the load ratio Ri before the acceleration to values according to the sensation of the driver. Thus, the cutaneous sensation acceleration αb and the cutaneous sensation front/rear jerk Jb can be computed at high accuracy.

Next, a vehicle controller for controlling an engine torque according to a fourth exemplary embodiment of the present invention will be described with reference to FIG. 6. In this exemplary embodiment, the throttle opening and the level of the speed change gear are detected as the amount of operation, the floor front/rear acceleration, the cushion load Wc, the backrest load Wb, the vehicle weight, the vehicle speed, and the road inclination are detected as the amount of vehicle/person state, and the acceleration sensation evaluating device of the first exemplary embodiment is used to control the engine torque. Therefore, parts in FIG. 6 corresponding to FIG. 1 and parts in FIG. 7 corresponding to FIG. 2 are indicated by the same reference numerals and the descriptions are omitted.

Figure 6:
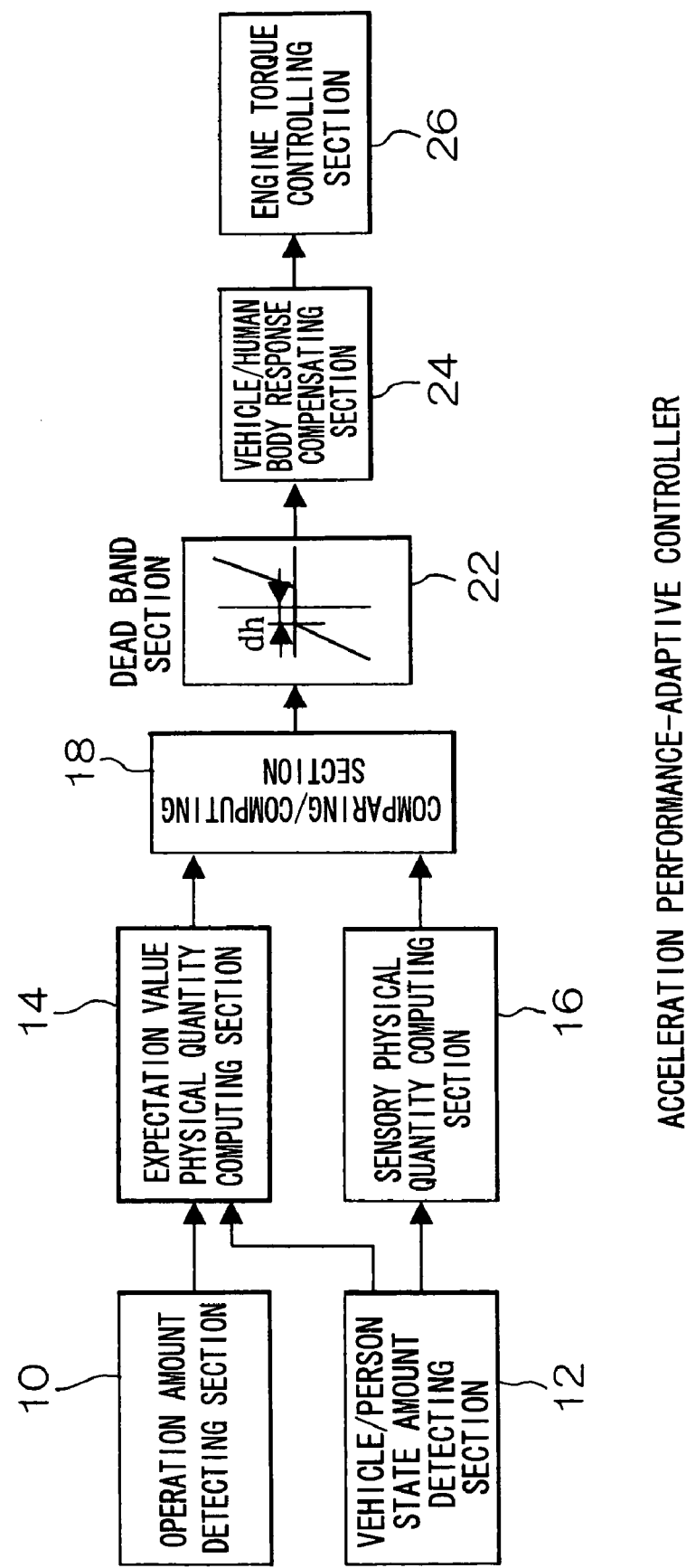
FIG. 6 is a block diagram showing a vehicle controller for controlling an engine torque of a fourth exemplary embodiment of the invention.

As shown in FIG. 6, in this exemplary embodiment, the output end of the comparing/computing section 18 is connected to a dead band section 22 having a dead band with a width of −dh to +dh of the perception threshold value of a human. The output end of the dead band section 22 is connected to a vehicle/human body response compensating section 24 for compensating for responses of the vehicle and the human body. The vehicle/human body response compensating section 24 is connected to an engine torque controlling section 26 for controlling the engine torque based on the output of the vehicle/human body response compensating section 24.

Figure 7:
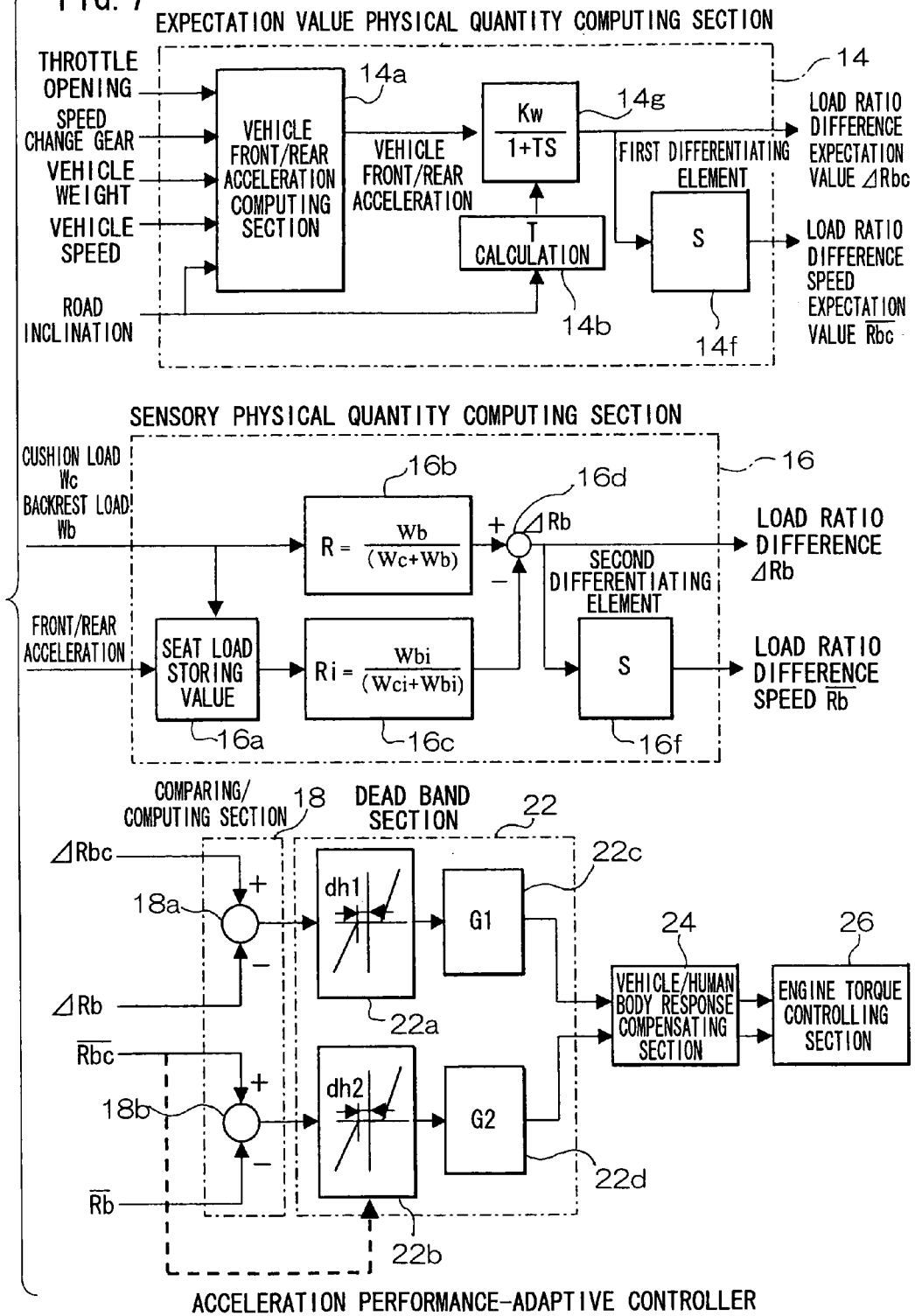
FIG. 7 is a block diagram showing the detail of the vehicle controller of the fourth exemplary embodiment.

As shown in FIG. 7, the expectation value physical quantity computing section 14 of this exemplary embodiment includes a first order delay element 14g using a final value as Kw instead of the first order delay element of FIG. 2. The change of acceleration of the seatback of the driver is passed through the first order delay element 14g including the final value Kw, and a load ratio difference expectation value ΔRbc is output from the first order delay element 14g.

The first differentiating element 14f connected to the output end of the first order delay element 14g differentiates the load ratio difference expectation value ΔRbc and outputs a load ratio difference speed expectation value Rbc.

Unlike the acceleration sensation evaluating device of FIG. 2, the sensory physical quantity computing section 16 of this exemplary embodiment does not include the multiplying element 16e. Therefore, the sensory physical quantity computing section 16 outputs the load ratio difference ΔRb and a load ratio difference speed Rb obtained by differentiating the load ratio difference ΔRb by the differentiating element 16f, respectively.

The comparing/computing section 18 of this exemplary embodiment includes the subtracting element 18a for subtracting the load ratio difference ΔRb from the load ratio difference expectation value ΔRbc, and the subtracting element 18b for subtracting the load ratio difference speed Rb from the load ratio difference speed expectation value Rbc.

The dead band section 22 includes a dead band section 22a, a dead band section 22b, a multiplying element 22c, and a multiplying element 22d. The dead band section 22a is connected to the output end of the subtracting element 18a and has a dead band with a width of −dh1 to +dh1. The dead band section 22b is connected to the output end of the subtracting element 18b and has a dead band with a width of −dh2 to +dh2. The multiplying element 22c is connected to the output end of the dead band section 22a and multiplies input data by a coefficient G1. The multiplying element 22d is connected to the output end of the dead band section 22b and multiplies input data by a coefficient G2.

Further, data of the load ratio difference speed expectation value Rbc is input to the dead band section 22b so as to change the width of the dead band according to the following equation:

$$dh2 = r \cdot Rbc \qquad (3)$$

where r is the Weber fraction and dh2≦control accuracy.

The output ends of the multiplying element 22c and the multiplying element 22d provided in the dead band section 22 are input to the vehicle/human body response compensating section 24.

The engine torque controlling section 26 controls the engine torque so as to be increased by controlling at least one of ignition timing, a fuel injection quantity, an air quantity, and the level of the speed change gear, accompanying respective increases in (a) a value obtained by multiplying a value obtained by removing the human threshold characteristic from the difference obtained by subtracting the load ratio difference ΔRb from the load ratio difference expectation value ΔRbc by the coefficient G1, and (b) a value obtained by multiplying a value obtained by removing the human threshold characteristic from the difference obtained by subtracting the load ratio difference speed Rb from the load ratio difference speed expectation value Rbc by the coefficient G2.

In the case of a diesel engine, the torque is controlled so as to be increased by increasing the fuel injection quantity, accompanying respective increases in (a) a value obtained by multiplying a value obtained by removing the human threshold characteristic from the difference obtained by subtracting the load ratio difference ΔRb from the load ratio difference expectation value ΔRbc by the coefficient G1, and (b) a value obtained by multiplying a value obtained by removing the human threshold characteristic from the difference obtained by subtracting the load ratio difference speed Rb from the load ratio difference speed expectation value Rbc by the coefficient G2. As a result, the acceleration performance of the vehicle may be improved.

Next, a vehicle controller of a fifth exemplary embodiment will be described with reference to FIG. 8. In this exemplary embodiment, only the sensory physical quantity computing section in the fourth exemplary embodiment is changed. That is, instead of detecting the cushion load Wc and the backrest load Wb, the cushion deflection and the backrest deflection are detected as the amount of vehicle/person state, the cushion load Wc is computed from the cushion deflection, and the backrest load Wb is computed from the backrest deflection. Therefore, illustration of parts other than the sensory physical quantity computing section 16 is omitted in FIG. 8, and parts in FIG. 8 corresponding to that of FIG. 7 are indicated by the same reference numerals and the descriptions are omitted.

Figure 8:
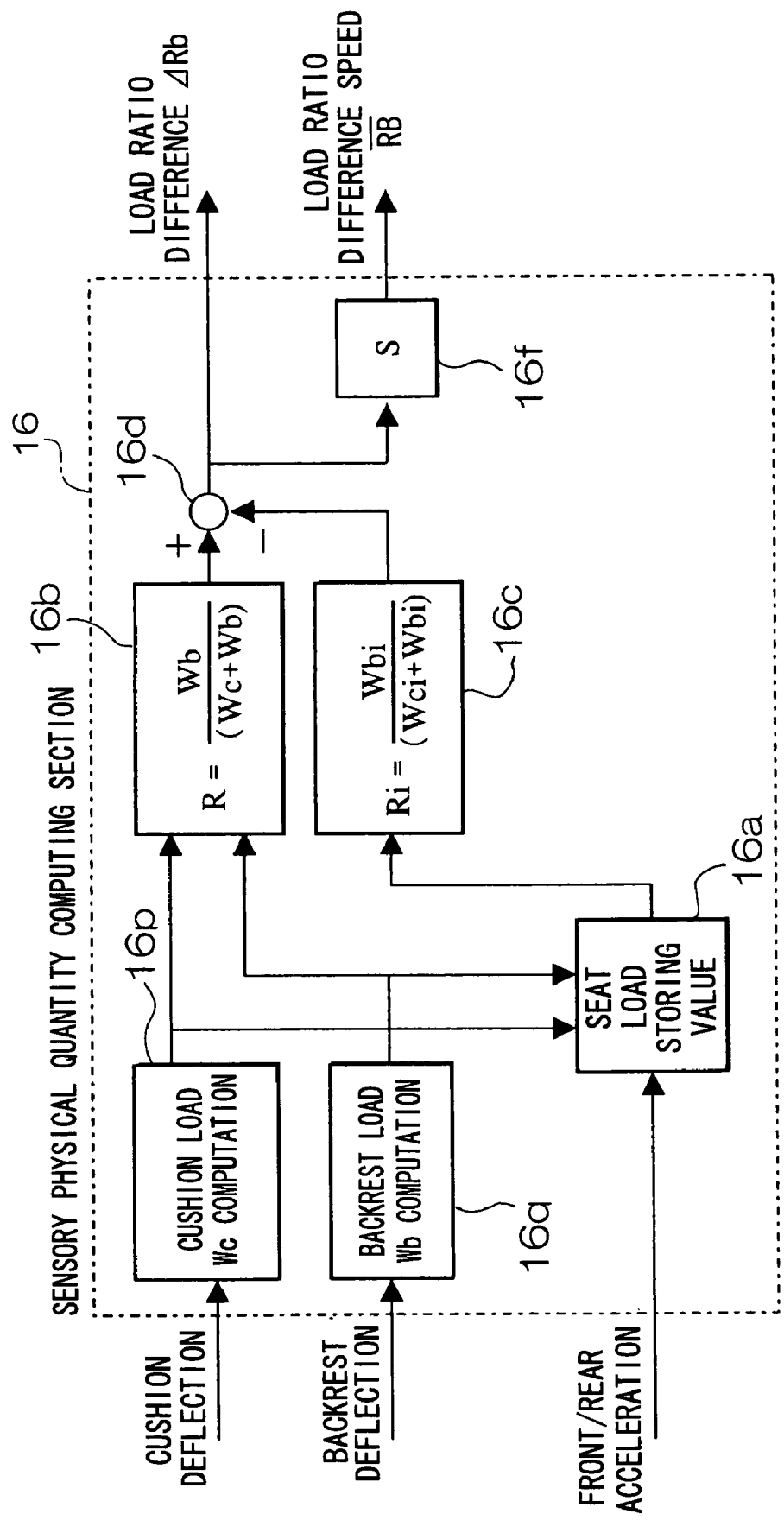
FIG. 8 is a block diagram showing the detail of a sensory physical quantity computing section of a vehicle controller of a fifth exemplary embodiment.

As shown in FIG. 8, the sensory physical quantity computing section of this exemplary embodiment includes a cushion load Wc computing section 16p for computing the cushion load Wc from the cushion deflection, and a backrest load Wb computing section 16q for computing the backrest load Wb from the backrest deflection. The cushion load Wc computing section 16p and the backrest load Wb computing section 16q are connected to the seat load storing section 16a and the load ratio computing section 16b, respectively. The seat load storing section 16a is connected to the load ratio computing section 16c.

As described above, the seat load storing section 16a stores the cushion load Wci and the backrest load Wbi before the acceleration occurs, based on the input floor front/rear acceleration.

In this exemplary embodiment, the cushion deflection and the backrest deflection are detected rather than detecting the cushion load Wc and the backrest load Wb. The cushion load Wc is computed from the cushion deflection, and the backrest load Wb is computed from the backrest deflection.

Next, an exemplary embodiment (a sixth exemplary embodiment) of a running environment compensation type acceleration performance-adaptive vehicle controller will be described. In this exemplary embodiment, a driver psychological characteristic compensating section 30 is provided in the acceleration sensation evaluating device of the first exemplary embodiment shown in FIG. 1.

According to this exemplary embodiment, the psychological characteristic of the driver according to a running environment can be compensated for.

Figure 9:
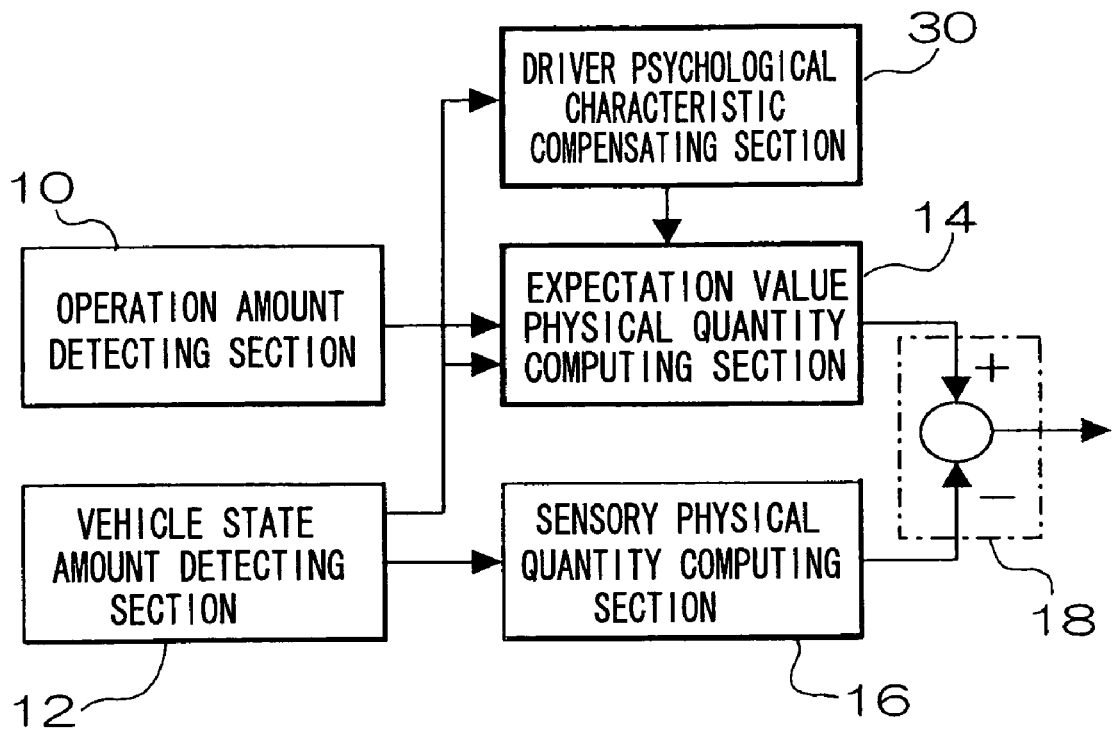
FIG. 9 is a block diagram showing an exemplary embodiment (a sixth exemplary embodiment) of a running environment compensation type acceleration performance-adaptive vehicle controller of the invention.

The main configuration of the running environment compensation type acceleration performance-adaptive vehicle controller is shown in FIG. 9. To compensate for the psychological characteristic of the driver according to the running environment, the driver psychological characteristic compensating section 30 for correcting the physical quantity of the expectation value is added to the configuration of the acceleration performance-adaptive vehicle controller in FIG. 7. When the driver rushes, the number of sudden acceleration and sudden deceleration may increase and a frequency of the accelerator and brake operation may increase. The degree of rush of the driver is computed from the frequency of such operation. The driver psychological characteristic compensating section performs computation so as to increase the magnitude of the final value Kw of the first order delay element 14g of the expectation value physical quantity computing section 14 shown in the exemplary embodiment of FIG. 7, according to the degree of rush, and corrects the load ratio expectation value and the load speed ratio expectation value, which are the physical quantities of the expectation value. Thus, the acceleration performance according to the psychological state of the driver can be obtained. Although the exemplary embodiment in which the driver psychological characteristic compensating section is provided in the acceleration performance-adaptive vehicle controller is shown, the driver psychological characteristic compensating is also applicable to the acceleration sensation evaluating device.

INDUSTRIAL APPLICABILITY

An acceleration sensation evaluating device capable of evaluating the acceleration sensation in various running patterns can be provided. Further, a vehicle controller capable of obtaining the smooth acceleration performance can be also provided.

The invention claimed is:

1. An acceleration sensation evaluating device comprising:
   an operation amount detecting section that detects an amount of operation of a vehicle by a driver when the vehicle is accelerated;
   a vehicle/person behavior detecting section that detects an amount of vehicle behavior, or the amount of vehicle behavior and an amount of driver behavior;
   an expectation value physical quantity computing section that computes as a physical quantity that the driver sense as a somatic sensation, a physical quantity of an expectation value indicating the expectation value of an acceleration performance that the driver expects, based on the detected value of the operation amount detecting section and the detected value of the vehicle/person behavior detecting section;
   a sensory physical quantity computing section that computes, as a physical quantity that the driver sense as a somatic sensation, a sensory physical quantity indicating a sensation of the acceleration which the driver senses, based on the detected value of the vehicle/person behavior detecting section;
   a computer having a comparing/computing section that compares the physical quantity of the expectation value with the sensory physical quantity and outputs a comparison result; and
   an evaluation value computing section that computes an evaluation value of the acceleration sensation based on the output of the comparing/computing section.

2. The acceleration sensation evaluating device according to claim 1, further comprising a driver psychological characteristic compensating section that corrects the physical quantity of the expectation value in order to compensate for the psychological characteristic of the driver according to a running environment.

3. The acceleration sensation evaluating device according to claim 1, wherein the expectation value physical quantity computing section comprises:
   a vehicle front/rear acceleration computing section that computes the vehicle front/rear acceleration based on a throttle opening, a speed change gear of a transmission, a vehicle weight, vehicle speed, and running road information;
   a response characteristic filter element that corrects and outputs the vehicle front/rear acceleration according to a response characteristic based on the running road information; and
   a differentiating element that differentiates the output value from the response characteristic filter element.

4. The acceleration sensation evaluating device according to claim 1, wherein the sensory physical quantity computing section comprises:
   a cutaneous sensation acceleration computing section that computes and outputs, based on an amount of change of a pushing load acting on a back of the driver before and after the acceleration, when the back of the driver is pushed against a seatback due to the front/rear oscillation of the driver at acceleration, a front/rear acceleration equivalent to the amount of change as a cutaneous sensation acceleration; and
   a differentiating element that differentiates the output value from the cutaneous sensation acceleration computing section and outputs the differentiation result as a cutaneous sensation front/rear jerk.

5. The acceleration sensation evaluating device according to claim 4,
   wherein the vehicle/person behavior detecting section detects a front/rear acceleration of the head of the driver, a front/rear acceleration of a shoulder of the driver, and a pitch angle of the shoulder of the driver, and
   the sensory physical quantity computing section comprises
   a deep sensation acceleration computing section that computes a front/rear jerk of a neck of the driver and as deep sensation acceleration, based on the front/rear acceleration of the head of the driver, the front/rear acceleration of the shoulder of the driver, and the pitch angle of the shoulder of the driver.

6. A vehicle controller comprising:
   an operation amount detecting section that detects an amount of operation of a vehicle by a driver when the vehicle is accelerated;
   a vehicle/person behavior detecting section that detects an amount of vehicle behavior, or the amount of vehicle behavior and an amount of driver behavior;
   an expectation value physical quantity computing section that computes, as a physical quantity that the driver sense as a somatic sensation, a physical quantity of an expectation value indicating the expectation value of an acceleration performance which the driver expects, based on the detected value of the operation amount detecting section and the detected value of the vehicle/person behavior detecting section;
   a sensory physical quantity computing section that computes, as a sensory physical quantity that the driver sense as a somatic sensation, a sensory physical quantity indicating a sensation of the acceleration which the driver senses, based on the detected value of the vehicle/person behavior detecting section;
   a computer having a comparing/computing section that compares the physical quantity of the expectation value with the sensory physical quantity and outputs a comparison result;
   a dead band section to which the output of the comparing/computing section is input and in which a human threshold characteristic is set to be a dead band;
   a vehicle/human body response compensating section to which the output of the dead band section is input, and that compensates and outputs a response characteristic of the vehicle and the human body ; and
   a controlling section that controls the vehicle so as to obtain the acceleration performance which the driver expects based on the output of the vehicle/human body response compensating section.

7. The vehicle controller according to claim 6, wherein the controlling section controls at least one of an engine torque and a gear ratio of a transmission.

8. The vehicle controller according to claim 6,
   wherein the expectation value physical quantity computing section comprises:
   a vehicle front/rear acceleration computing section that computes a vehicle front/rear acceleration based on a throttle opening, a speed change gear of a transmission, a vehicle weight, vehicle speed, and running road information;

a response characteristic filter element that corrects and outputs the vehicle front/rear acceleration according to a response characteristic based on the running road information; and a differentiating element that differentiates the output value from the response characteristic filter element.

9. The vehicle controller according to claim 6,
wherein the sensory physical quantity computing section comprises:

a load ratio difference computing section that computes and outputs, as a load ratio difference, an amount of change of a pushing load acting on a back of the driver before and after the acceleration, when the back of the driver is pushed against a seatback due to the front/rear oscillation of the driver at acceleration; and a differentiating element that differentiates the output value from the load ratio difference computing section and outputs a differentiation result as a speed of the load ratio difference.

10. The vehicle controller according to claim 6, wherein the width of the dead band of the dead band section is changed according to the magnitude of the physical quantity of the expectation value.

* * * * *